United States Patent
Lohi et al.

(10) Patent No.: US 8,155,871 B2
(45) Date of Patent: Apr. 10, 2012

(54) METHOD, DEVICE, DEVICE ARRANGEMENT AND COMPUTER PROGRAM FOR TRACKING A MOVING OBJECT

(75) Inventors: Hannu Lohi, Kello (FI); Samuli Vanhala, Oulu (FI); Harri Piltonen, Varjakka (FI)

(73) Assignee: Tracker Oy, Oulunsalo (FI)

( * ) Notice: Subject to any disclaimer, the term of this patent is extended or adjusted under 35 U.S.C. 154(b) by 882 days.

(21) Appl. No.: 11/817,346

(22) PCT Filed: Feb. 27, 2006

(86) PCT No.: PCT/FI2006/050081
§ 371 (c)(1),
(2), (4) Date: Aug. 11, 2008

(87) PCT Pub. No.: WO2006/092466
PCT Pub. Date: Sep. 8, 2006

(65) Prior Publication Data
US 2009/0043501 A1 Feb. 12, 2009

(30) Foreign Application Priority Data
Mar. 2, 2005 (FI) .................................... 20055102

(51) Int. Cl.
*G01C 21/00* (2006.01)
*G08B 13/14* (2006.01)
*H04W 4/00* (2009.01)

(52) U.S. Cl. ................... 701/207; 340/572.1; 455/426.1

(58) Field of Classification Search .................. 701/207, 701/208, 209, 212, 210, 408, 412, 428, 452, 701/451, 516, 517, 519; 455/410, 457, 456, 455/89, 405–408; 340/988–996, 825.49, 340/825.36, 5.61, 539.1, 539.13, 568.1, 572.1, 340/572.4, 573.1, 10.1, 10.51, 505; 379/59, 379/58; 342/357.09, 357.13, 419, 457, 357.07; 235/380; 415/414; 700/115, 213, 225, 226
See application file for complete search history.

(56) References Cited

U.S. PATENT DOCUMENTS

| | | | |
|---|---|---|---|
| 6,014,080 A | 1/2000 | Layson, Jr. | |
| 6,327,533 B1 | 12/2001 | Chou | |
| 6,353,390 B1 | 3/2002 | Beri et al. | |
| 6,385,451 B1 * | 5/2002 | Kalliokulju et al. .......... 455/437 |
| 6,437,696 B1 * | 8/2002 | Lemelson et al. ......... 340/573.4 |
| 6,838,998 B1 | 1/2005 | Brown et al. | |
| 2004/0257210 A1 * | 12/2004 | Chen et al. ............... 340/426.19 |
| 2005/0099990 A1 * | 5/2005 | Uusikartano et al. ......... 370/349 |

* cited by examiner

*Primary Examiner* — James P Trammell
*Assistant Examiner* — Muhammad Shafi
(74) *Attorney, Agent, or Firm* — Volpe and Koenig, P.C.

(57) ABSTRACT

The invention relates to a location method, a locating device, a locating arrangement and a computer program for tracking an object, such as a dog. The method utilises GPS locating, the event time of which may be controlled by the user. In addition, the user may define a data transmission network via which location data are primarily communicated to the tracker's device. By means of the frequency of measurements and the data transmission network used, the power consumption of the locating device of the object being tracked is minimised.

13 Claims, 6 Drawing Sheets

METHOD, DEVICE, DEVICE ARRANGEMENT AND COMPUTER PROGRAM FOR TRACKING A MOVING OBJECT

FIELD OF THE INVENTION

The invention relates to a method, a device, a device arrangement and a computer program for tracking a living, moving object, such as a dog.

BACKGROUND

Different tracking arrangements exist for tracking a moving object, such as, for example, a hunting dog. One may attach to a dog, for example, a radio transmitter the analog signal transmitted by which is monitored with an appropriate directional antenna. With this arrangement, one is able to detect the direction of the dog and, on the basis of the level of a received signal, to make an assessment, even though not a very accurate one, on how far away the dog with its radio transmitter is. The described arrangement has disadvantages. If there exist several separate objects being tracked in the same area, tracking devices may disturb each other. This happens, for example, when two or more devices use the same frequency in tracking. The frequency band assigned to different tracking systems varies from one country to another. Thus, this situation is not rare in such countries in which the used frequency band is narrow and there is a considerable number of users. In addition, the continuous on-mode of the transmitter consumes the power of the battery of the transmitter, and thus its operating time is limited with one charging.

Also known is a tracking solution which utilises GPS (Global Positioning System) locating and a GSM (Global System for Mobile communications) network. In this tracking method, the GPS locator is at least in the device carried by the dog being tracked. The transmitter carried by the dog transmits the result of location performed by means of the GPS either as an SMS (Short Message Service) message or a data call to the tracker's device via a conventional GSM network. The tracker's device may also utilise a map base describing the area, in which case the location of the dog being tracked may be indicated with said map.

The system may function in several modes. First, it may function with a call principle, in which case the tracker transmits a locating call. To this, the device carried by the object being tracked responds with an SMS message which includes location data. This arrangement is not totally real-time, but the tracker has either the result of previously performed location in his/her use, or the tracker will have to perform a new location which requires time.

Tracking may also be periodic, in which case location data are transmitted after a defined time has elapsed. Each tracking result is communicated by using a data call.

Tracking may also be area-specific, in which case if the object being tracked stays within a defined area, no location data are communicated.

If one wishes to communicate location data to several tracking devices at the same time, one has to transmit for each tracking device either its own SMS message or connect a data call connection. SMS messages are always charged on the basis of transmitted messages. Thus, in this tracking arrangement, the "continuous tracking" of the object is relatively expensive, because one has to pay a price defined by the operator for messages communicated of each transmitted location data.

A problem of continuous tracking is mainly the power consumption of the terminal carried by the object being tracked. The charge in the terminal battery will not be sufficient for long, if the data transmission connection is continuously on. The requirement is thus to transmit location data only when someone requires it, but then as real-time and continuously as possible. Also the GPS locator consumes plenty of the charge in the terminal batteries, and thus its continuous on-mode essentially shortens the operating time of the terminal. The worst possible situation is that the device has poor reception and the connection breaks off after a locating request. Then, it is possible that the terminal keeps transmitting location data with full power to an unattainable user and, because of this, the power of the battery of the terminal runs down fast.

SUMMARY

The object of the invention is to present a method and a device arrangement with which one is able to track a desired object, such as a hunting dog, by minimising the power consumption of the device carried by the object being tracked and simultaneously by optimising the connection mode utilised but in real-time, if desired.

The objects of the invention are achieved with a tracking method and device arrangement in which the location data of the object being tracked are communicated to the tracker's device by utilising appropriate packet-switched data transmission, when such is available. One may utilise, for example, a UMTS/GPRS, an EDGE/GPRS or a GSM/GPRS network as the transmission path. If no packet-switched network is available, location data may be communicated via a circuit-switched GSM connection or as a direct radio transmission to the tracker's device.

An advantage of the invention is that the operating time of the locating device carried by the object being tracked with one charging of the battery may be maximised by controlling the search of location data and the transfer of location data according to requirements.

A further advantage of the invention is that real-time location data including the location of the object may be cost-effectively transferred with a packet-switched connection, when such is available.

Furthermore, an advantage of the invention is that the location data of the object may also be transferred in a circuit-switched GSM network or via a direct radio link to the tracker's terminal, if a packet-switched connection is not available.

A further advantage of the invention is that location data may be communicated simultaneously to several tracking devices via a cellular network.

Furthermore, an advantage of the invention is that the tracking costs of the object only consist of the amount of data transferred, even though the tracking connection is connected all the time.

A further advantage of the invention is that the definition of the operation of the object being tracked may be performed by using the SIM (Subscriber Identity Module) card of the object being tracked.

Additionally, an advantage of the invention is that, by means of it, one is able to implement a locating and pickup service of the object being tracked, for example, as a purchasable service, in which case the owner of the object does not have to possess a device capable of tracking the object.

The method, the tracking device, the tracking arrangement and the computer program implementing the tracking arrangement according to the invention are characterised by what is presented in the independent claims.

Some advantageous embodiments of the invention are described in the dependent claims.

The basic idea of the invention is the following: A module is attached to an object to be tracked, such as a hunting dog, which module advantageously comprises a GPS locator, a terminal operating in a cellular network, such as GSM/GPRS, and a radio transmitter. The location of the object is performed with the GPS locator either at defined intervals or continuously. Location data are advantageously communicated using a packet-switched data transmission connection to the tracker's device, if such a data transmission connection is available. If no packet-switched connection is available, one utilises either a circuit-switched cellular network, such as a GSM network, or a direct radio connection to the tracker's terminal. The tracker means either the owner of the dog or an organisation which provides locating services of the object. The service of the organisation may include, in addition to tracking the object located, also the pickup of the object and its return to the owner. With a method according to the invention, one may maximise the operating time of the terminal carried by the object being tracked with one charging of the battery.

BRIEF DESCRIPTION OF THE DRAWINGS

The invention will now be described in detail. The description refers to the accompanying figures in which.

DETAILED DESCRIPTION

Figure 1A:
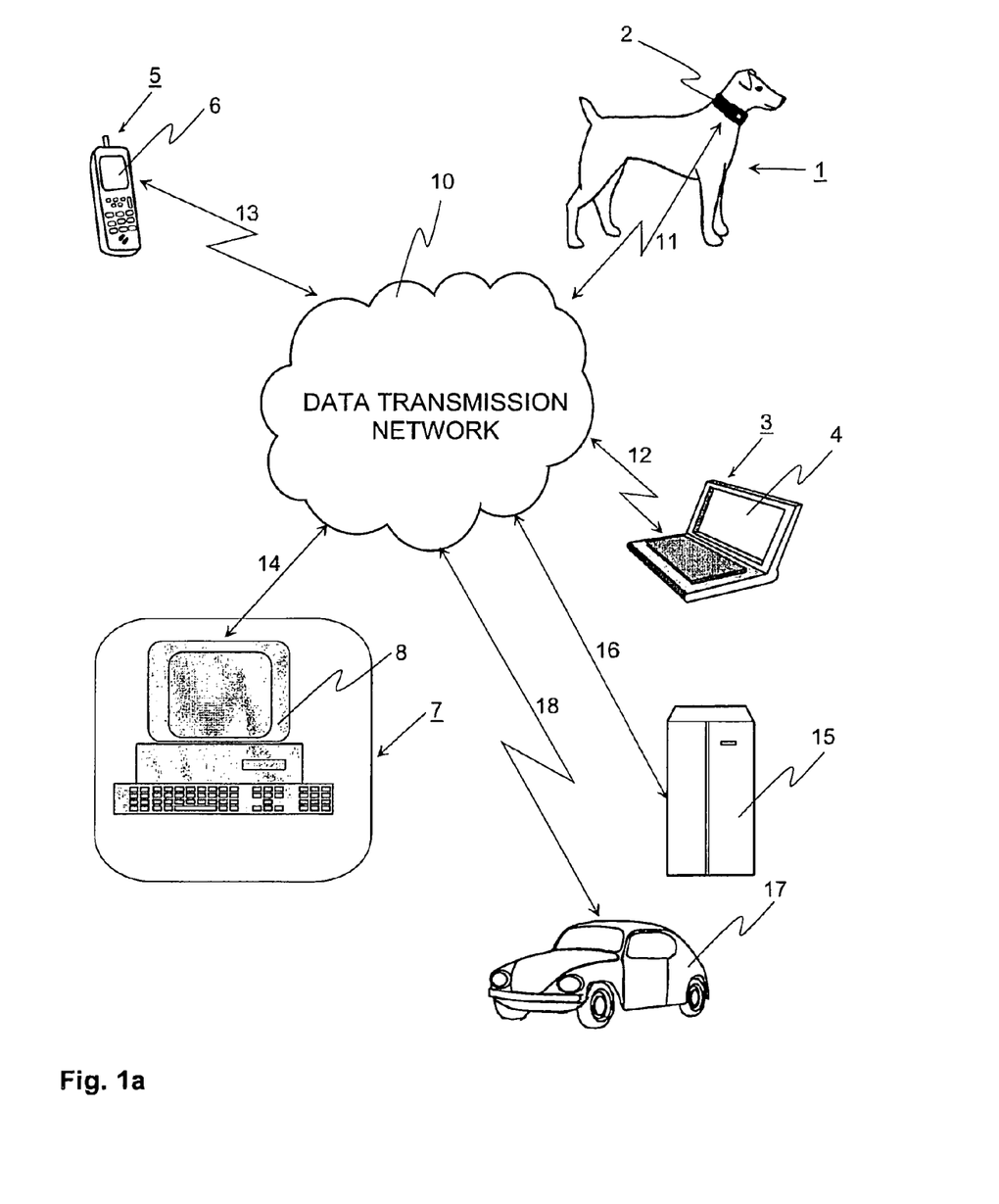
FIG. 1a shows by way of examples the primary parts of a tracking arrangement according to the invention.

FIG. 1a shows by way of examples a tracking and locating arrangement according to the invention. Designation 10 refers to a data transmission network which may operate either circuit-switched or packet-switched. The data transmission network shown in FIG. 1a is utilised in transferring the location data of an object 1 being tracked to a defined tracking device 3, 5 or 7. The data transmission network 10 may communicate, for example, UMTS/GPRS, EDGE/GPRS, GSM/GPRS or GSM/SMS messages.

The location data of the object 1 being tracked are measured with a locating device 2 carried by the object 1 being tracked which device, in the example of FIG. 1a, advantageously comprises both a prior-art GPRS terminal and a GPS locator. The GPS locator may be controlled to perform locating measurements either continuously, periodically, when a defined condition is realised or only at a given locating command. The data transmission connection from the locating device 2 carried by the object 1 being tracked to the GSM/GPRS network 10 is implemented via a wireless data transmission connection 11 according to prior art. The locating device 2 carried by the object 1 being tracked also comprises a SIM card according to prior art which identifies the GPRS subscription used in data transmission. By utilising the features of the SIM card, one is also able to change the operation mode of the locating device 2 at a command given via radio at any time.

In the transfer of location data, the locating device 2 may use, for example, one of the following data transmission modes: a UMTS/GPRS, an EDGE/GPRS, a GSM/GPRS, a GSM/SMS message. It may also establish a direct radio connection to the tracker's device, if no connection to a cellular network 10 can be established. The order in which the locating device 2 tries to utilise available data transmission networks may be decided by the user of the tracking device 3. The tracker may then choose the network connection order such that the transmit power of the locating device 2 in the direction of the data transmission network 10 is as small as possible for saving the battery capacity of the locating device 2. In an advantageous embodiment of the invention, the utilising order of data transmission modes is programmable by utilising the SIM card of the locating device 2.

In the example of FIG. 1a, the main user of the arrangement possesses a tracking device 3, 5 which is advantageously a so-called communicator 3. In this context, it means a terminal of a cellular network 10 equipped with additional functions which communicates via a wireless connection 12 with the exemplary GSM/GPRS network 10 of FIG. 1a. It advantageously includes a large or largish display unit 4 which may show a map base of the area in which the object 1 being tracked is moving. The GPS location data of the object 1 being tracked may be shown on this map base. At the same time, one may advantageously track several objects 1 being tracked with the same tracking device 3. This is possible if the tracking device 3 comprises data on each SIM card of the locating devices 2 carried by the objects pertaining in tracking. By means of the tracking device 3, one may change the settings and the locating mode of the locating device 2 carried by the object 1 being tracked, if necessary.

In the arrangement according to the invention, the location data of the object being tracked may also be communicated to conventional cellular-network terminals 5 by means of a wireless data transmission connection 13. This is advantageous, for example, when a hunting group is in question. This operation requires a separate server unit (not shown in FIG. 1a) which has a fixed IP address into which conventional terminals 5 may establish a data transmission connection. The location data on the server may then by shown on a display 6 of the terminal 5, either on a map base, as coordinate data or distance data from a defined point. Also with conventional cellular-network terminals 5, one may change the locating settings of the locating device 2 carried by the object 1 being tracked.

As in the example of FIG. 1a a GPRS connection is used in data transmission from the locating device 2 of the object 1 being tracked, the data transmission connection 11 is in principle always connected. However, one only has to pay for the amount of data transferred. Thus, with this tracking procedure according to the invention, the tracker may always affect with his/her actions the total costs of the tracking of the object 1. If continuous tracking is required, location data are continuously transmitted over the GPRS connection, which obviously incurs additional costs to the tracker. On the other hand, if location data are required only rarely, the location may be performed, for example, only at a command given by the tracker. Then, data transmission costs remain minimal, because only transmitted data incur costs.

In an advantageous embodiment of the invention, the tracking of the object 1 has been left to an organisation 7 to attend to. This organisation has in its use a data processing system 8 which comprises the identifying data of the SIM cards of the locating devices 2 of objects 1 being tracked. The data processing system 8 is connected to a data transmission network 10 via a data transmission connection 14. From the data processing system 8, one may give a command which is directed to a chosen locating device 2 and launches GPS locating in it. It is also possible that the measurement is active all the time, and that the location data are communicated real-time to said data processing system 8. The location data are thus stored to the data processing system 8 always when desired. In this embodiment of the invention, the owner of the object being tracked does not require a terminal 3 or 5 capable of tracking the object 1 in his/her use. It is sufficient to have a contact when desired to the organisation 7 from which the location data of the defined object 1 being tracked are available.

The organisation 7 may also offer a pickup and return service of the object 1 being tracked either by utilising the pickup service of the organisation 7 or by utilising, for example, the services of taxi cabs 17. Taxi cabs 17 are well suited for a pickup service, because they have a GPRS data transmission connection based on their own order system and appropriate locating and map systems which are utilised in the planning of routes. In the example of FIG. 1a, taxi cabs 17 utilise a geographical data/order data system on a server 15. This data processing system is connected with a data transmission connection 16 to the same data transmission network 10 as the data processing system 8 of the organisation 7. In an advantageous embodiment of the invention, the data processing system 8 transmits a message to the geographical data server 15 used by taxi cabs. This message includes the geographical data of the object 1 being tracked. The geographical data are communicated via data transmission connections 16 and 18 to an appropriate taxi cab. By means of this geographical data, the taxi cab 17 finds the object 1 and, if necessary, delivers it to the owner.

Figure 1B:
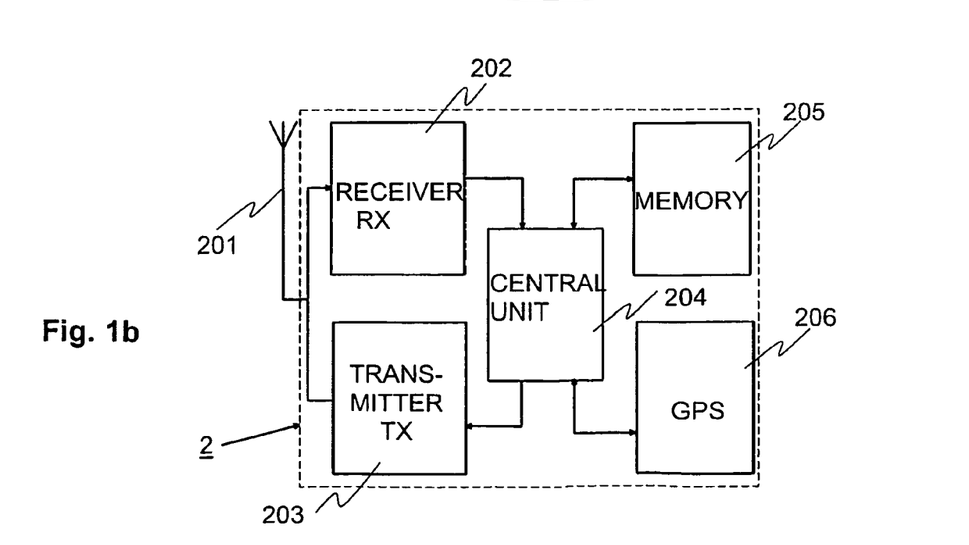
FIG. 1b shows by way of examples the primary parts of a tracking device according to the invention.

FIG. 1b shows by way of examples a locating device 2 according to the invention. FIG. 1b shows by way of examples the principal parts of such a locating device 2 in which the tracking method according to the invention is utilised. The locating device 2 uses an antenna 201 in transmitting and receiving signals in the data transmission network. Designation 202 refers to the receiver means RX of the locating device. The receiver RX comprises means according to prior art for all messages or signals being received.

Designation 203 refers to those means which form a transmitter TX of the locating device 2. The transmitter means 203 perform all signal processing operations for the signal being transmitted required when utilising a data transmission network.

An essential part of the locating device 2 is a GPS locator 206. It receives geographical data from GPS satellites advantageously via the antenna 201.

Additionally, from the viewpoint of utilising the invention, central parts of the locating device 2 are a central processing unit 204 controlling its operation and a memory 205 of the locating device 2 in which the software application required in the implementation of the locating method according to the invention is advantageously stored. As one operates in a cellular network according to prior art, such as in a GSM/GPRS network, the locating device 2 also requires a SIM card (not shown in FIG. 1b) for its operation. By means of the data on the SIM card, each locating device 2 may be identified. The SIM card may also be utilised in optimising the functions of the locating device 2. By utilising the SIM card, the locating device 2 may be controlled to use such a data transmission network 10 in which the transmission power of the transmitter 203 is as small as possible.

The central processing unit 204 controls the locating operation according to the invention based on commands received from the tracker's device 3. The central processing unit 204 advantageously stores the location data calculated in the GPS locator in the memory 205. According to the defined operation models in FIGS. 2a-e, the central processing unit 204 directs location data to the transmitter 203. The transmission of location data may occur either immediately after the locating result has been completed or when a defined decision criterion is realised. A packet-switched data transmission connection, such as GPRS in the case of a GSM network, is used in data transmission.

Figure 2A:
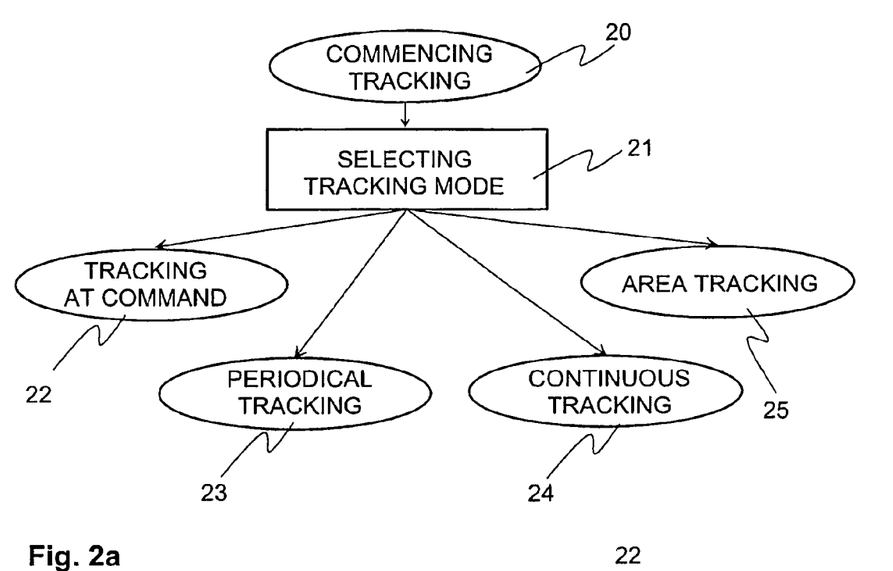
FIG. 2a shows an exemplary flow chart of the selection of a tracking mode of the tracking method according to the invention.

FIG. 2a shows an exemplary flow chart of possible tracking modes to be selected. In stage 20, tracking is commenced. This may be performed, for example, by activating a software application according to the invention in the communicator 3 of FIG. 1a. Then, the user has in stage 21 a possibility to select from four different tracking modes. If he/she selects alternative 22, location data are updated and displayed only at a locating command transmitted by the tracker. By selecting alternative 23, location data are automatically updated at defined intervals, for example, at the intervals of one or ten minutes. Alternative 24 utilises continuous location, and location data are transferred real-time, for example, via a packet-switched GPRS connection to the tracker's device 3. Alternative 25 utilises a tracking condition set in the locating device 2 of the object 1 being tracked. If the measured geographical data alter more than a set limit value, the data transmission of locating measurement is commenced to the tracker's device 3 without a separate command. In other cases, no location data are transferred.

Figure 2B:
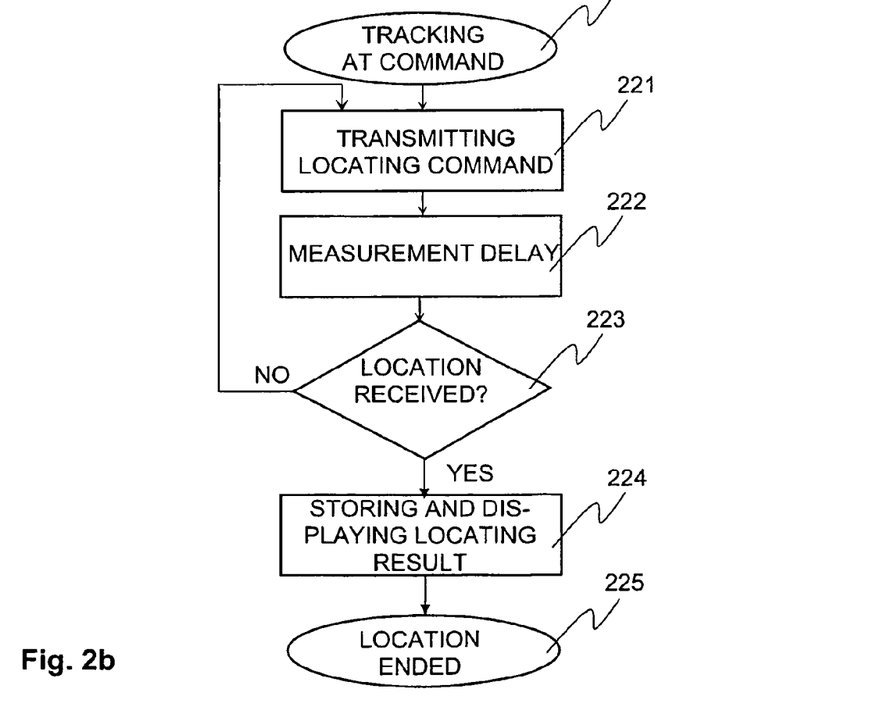
FIG. 2b shows an exemplary flow chart of the operation mode of "tracking at command" of the tracking method according to the invention.

FIG. 2b shows an exemplary flow chart of the operational principal stages of alternative 22, tracking at command. In this embodiment, the tracking of the object 1 is commenced in stage 22. Then, a locating command is transmitted with the tracker's communicator 3, stage 221. A defined time elapses after a command transmitted to the locating device 2, delay 222, whereby location may be performed in the locating device 2, if the locating device 2 does not already have in its use location finding data more recent than the defined time. If appropriate location data are available, these data are transmitted, and the GPS locator 206 is not turned on for saving the power of batteries. If location is however required, a defined time window for the use of the GPS locator 206 may be set in which the location finding has to succeed. If it does not succeed during this time, the GPS locator 206 is turned off for saving the power of batteries and the last geographical data stored in the memory of the locating device 2 are transmitted to the tracker's terminal 3.

After a defined delay in stage 223, the tracker's terminal 3 checks if location data have been received or not. If no location data have been received, advantageously a new locating command is transmitted. Commands are transmitted so long that location data are received or the tracker finishes locating attempts.

If in stage 223 location data are verified received, one passes to stage 224. In it, location data are stored in the memory of a communicator 3 or other tracking arrangement 8. If required, received location data may also be displayed on the display of the tracking device or arrangement. The locating process ends after this in stage 225.

Figure 2C:
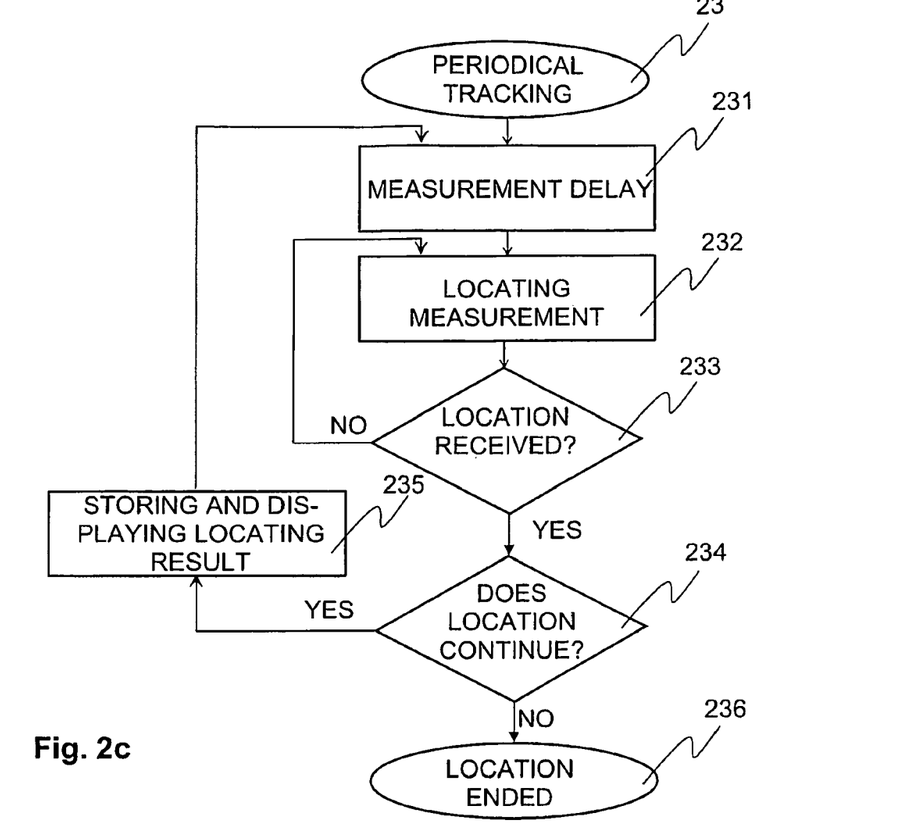
FIG. 2c shows an exemplary flow chart of the operation mode of "periodic tracking" of the tracking method according to the invention.

FIG. 2c shows an exemplary flow chart of the operational principal stages of alternative 23, periodical tracking. In stage 23, periodical tracking is commenced. Then advantageously, a command is transmitted to the locating device 2 of the object 1 being tracked which command controls it to periodical tracking. This means that location is automatically performed at defined intervals, until a command ending the location is given to the locating device.

Between two successive location findings, there is a measurement delay 231 which may be defined as long as desired. When the time delay 231 has elapsed of the previous location, a new location is performed, stage 232. The result of locating is transmitted via the GPRS connection to the tracker's device 3. As the tracker's device 3 is aware of the interval between locations, it is able to compute if it should have received location data or not, stage 233. If no location data have been received in the defined time, it is advantageously possible to transmit a new separate locating command for an immediate location.

If location data have been verified received in stage 233, one examines in stage 234 if locating is desired to continue. If the comparison in stage 234 gives the result NO, locating is ended in stage 236.

However, if one wishes to continue locating, one moves from stage 234 to stage 235 in which the received location data are stored in the receiver's device 3 and in which they are displayed on the display unit 4 of the device, if required. After this, the locating process according to the invention returns to stage 231 in which the delay between measurements is commenced. After the measurement time delay 231 has elapsed, a new locating measurement is commenced. Thus, the locating process is automatically repeated so long that in stage 234 one establishes in a certain phase that there is no need to continue locating.

Figure 2D:
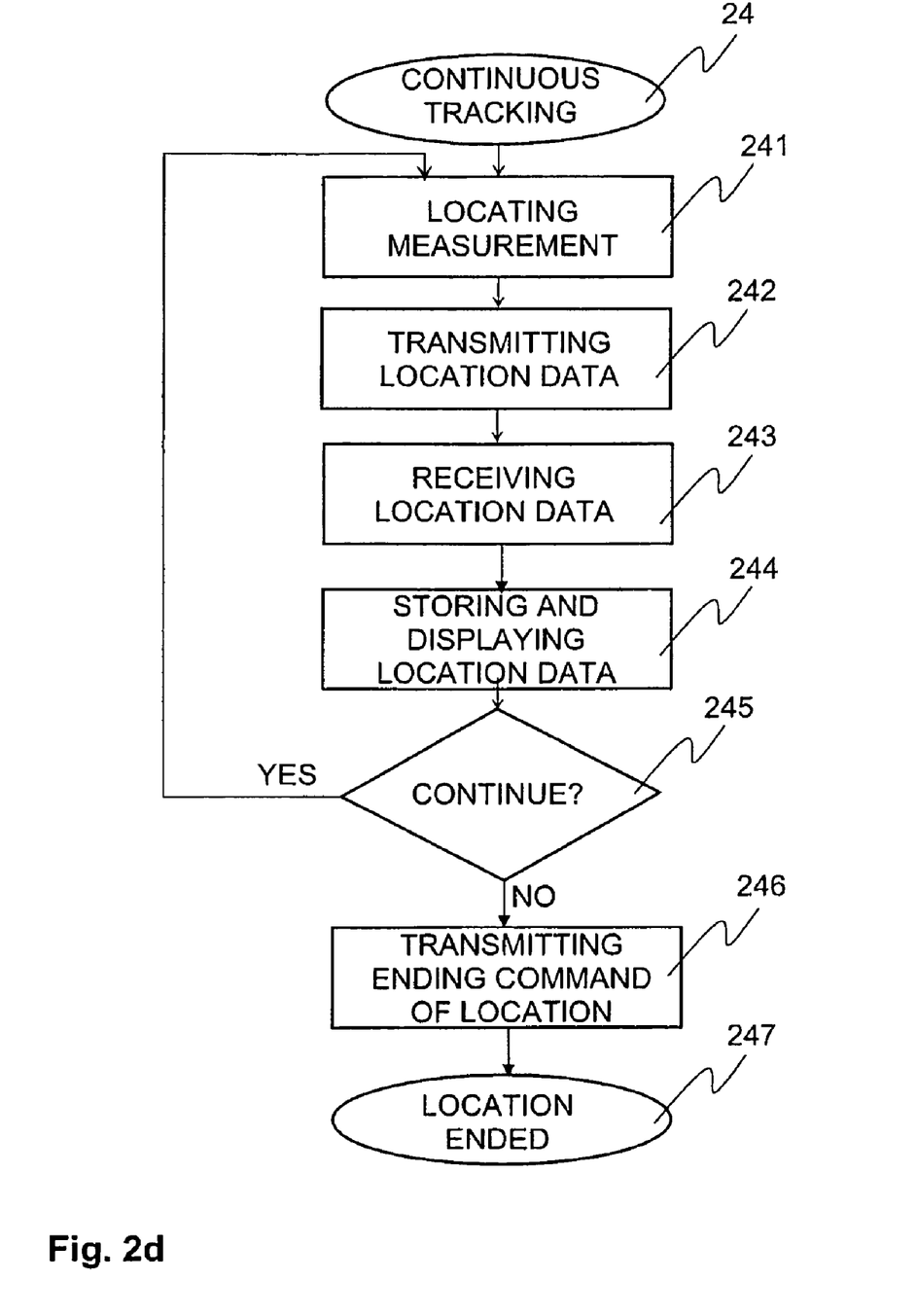
FIG. 2d shows an exemplary flow chart of the operation mode of "continuous tracking" of the tracking method according to the invention.

FIG. 2d shows an exemplary flow chart of the operational principal stages of alternative 24, continuous tracking. The time how soon after the previous location finding a new finding is performed is advantageously definable by the tracker. The SIM card included in the locating device 2 may also be utilised in location finding.

In stage 24, continuous tracking is commenced. Then advantageously, a command is transmitted to the locating device 2 of the object 1 being tracked which command controls it to perform locating measurements continuously and to communicate them immediately, for example, by means of a GPRS data transmission connection to the tracker's device 3.

Locating measurement is performed in stage 241, if no adequately new locating result exists in the memory 205 of the locating device 2. The locating result, either a result from the memory or a new result measured, is transmitted, for example, via a GPRS connection, stage 242. In stage 243, the tracker's device 3 receives the transmitted location data. The location data received in stage 244 are stored in the memory of the tracker's device 3. Advantageously, they are also simultaneously displayed on the display unit 4 included in the tracker's device 3. When the storing has been performed, in stage 245, one tests if location is desired to continue. If the decision is YES, the tracker's device advantageously transmits a measurement continuation message to the locating device 2. Then, the locating process commences again from stage 241 and a new locating measurement is performed. The locating process is repeated so long that, in stage 245, one establishes that location is wished to be ended. Then, a separate ending command is transmitted by the tracker's communicator 3 in stage 246. After receiving this ending command, the locating device 2 of the object being tracked turns off its GPS locator, but advantageously leaves its GPRS transmitter-receiver in stand-by mode. This action considerably saves the power of the batteries of the locating device 2, because the continuous operation of the GPS locator consumes a lot of power. If the locating device 2 has moved to such a location that it cannot receive messages from the tracking device 3, it will turn off its GPS locator 206 after a user-defined time has elapsed for saving the power of batteries.

Figure 2E:
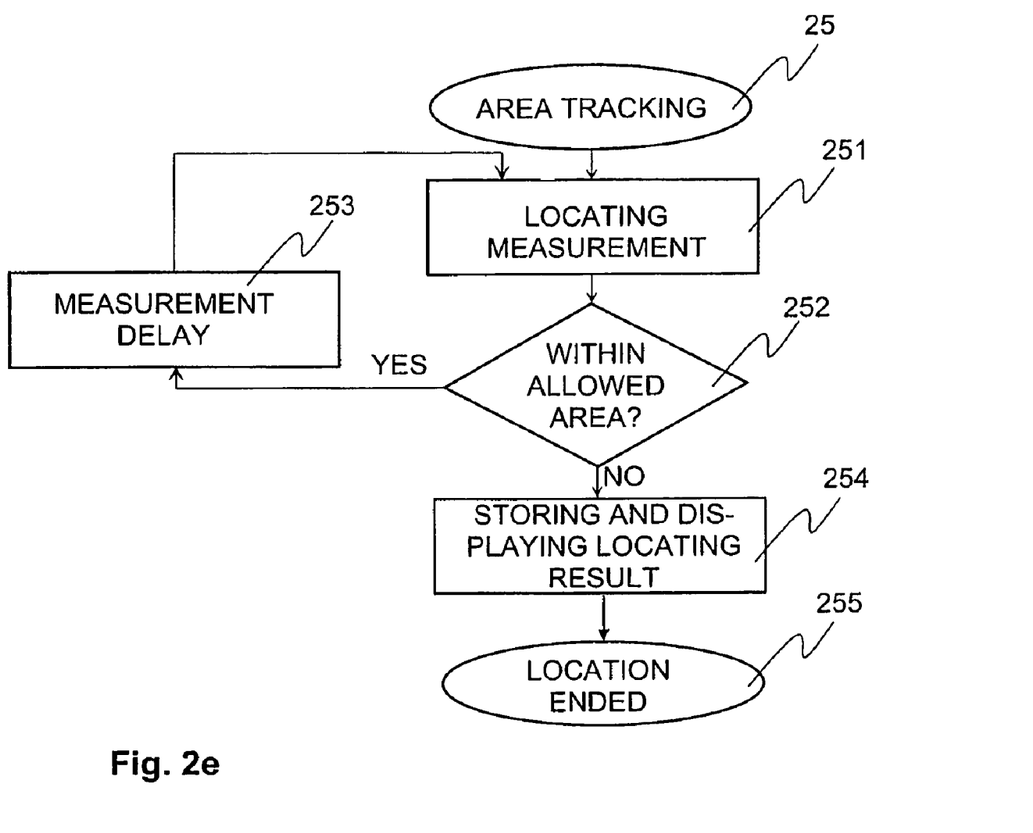
FIG. 2e shows an exemplary flow chart of the operation mode of "area tracking" of the tracking method according to the invention.

FIG. 2e shows an exemplary flow chart of the operational principal stages of alternative 25, area tracking. This means that the locating device 2 performs GPS measurements at desired intervals or continuously. So long as the locating result shows that the object 1 being tracked has remained in an area pre-defined for it, no data on it are communicated to the tracker's device 3.

In stage 25, area tracking is commenced. Then advantageously, a command is transmitted to the locating device 2 of the object 1 being tracked which command controls it to area tracking. In stage 251, location is performed. If in stage 252 one verifies that the locating result is within the allowed geographical area, one moves to stage 253 which represents the time between two successive locations. When said time has elapsed, a new location is performed in stage 251, and its result is verified in stage 252. This loop runs so long that finally, in stage 252, one establishes that the locating result is outside the defined geographical area. Then, a message is transmitted with the GPRS connection in stage 254 to the tracker's device 3. Advantageously, the received locating result is also displayed in the tracker's device and area tracking ends in stage 255. After this, the tracker may with his/her own device 3 control the locating device 2 of the object 1 being tracked to some other above-described tracking mode 22, 23 or 24.

Figure 3:
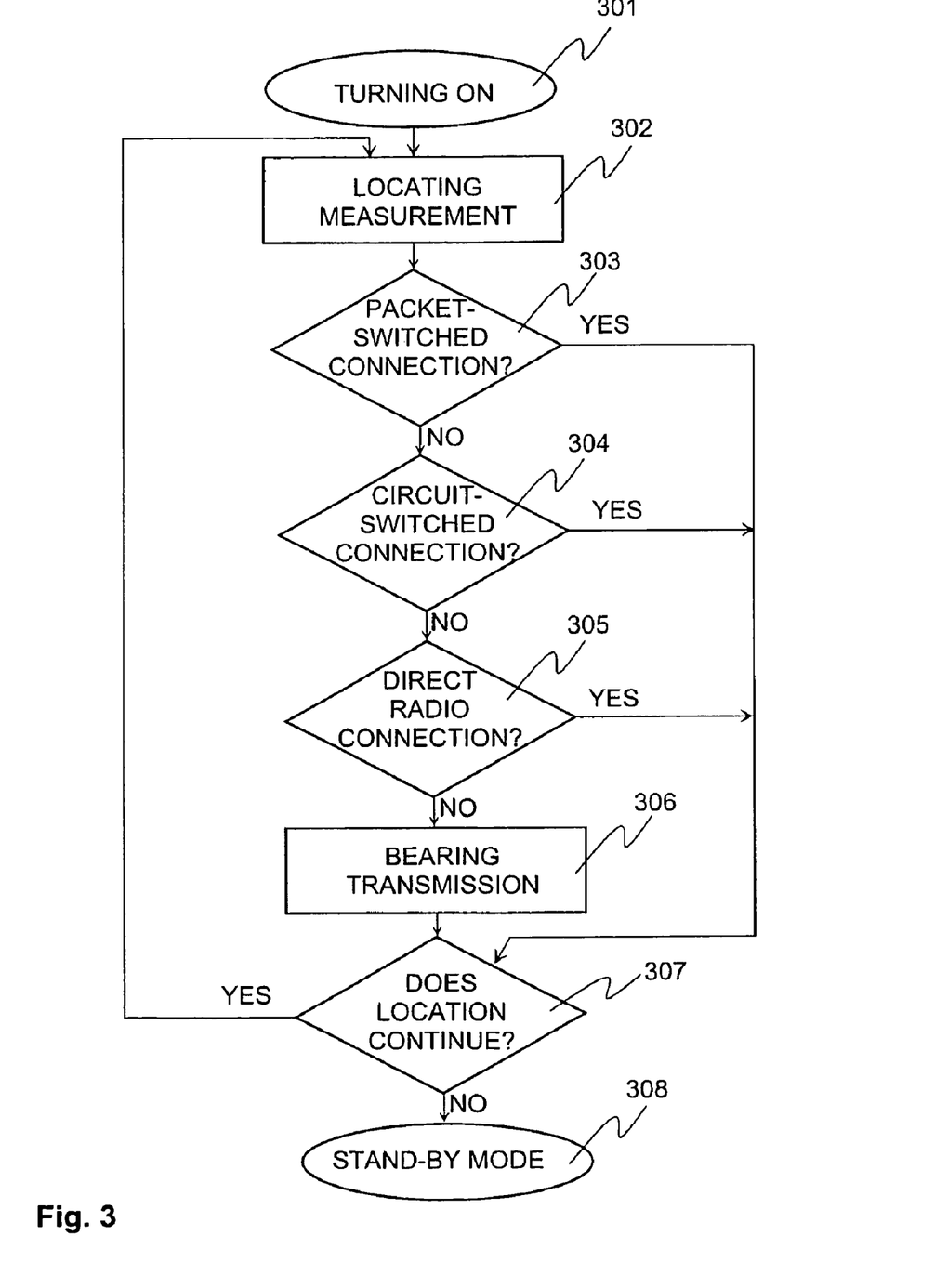
FIG. 3 shows an exemplary flow chart of the definition process of a data transmission mode of location data.

FIG. 3 shows an exemplary flow chart of the selection of data transmission mode performed in the tracking method according to the invention. The selection order presented in the flow chart is only exemplary. The order is advantageously changeable by the tracker. Changes may be performed utilising the SIM card of the locating device 2.

In stage 301, tracking of the object is commenced. In stage 302, locating measurement is performed in one of the above-described modes 22, 23, 24 or 25. When the first locating result exists, a data transmission apparatus pertaining to the locating device 2 tries to connect to a servicing data transmission network 10.

In the example of FIG. 3, a packet-switched data transmission mode has been selected as the primary data transmission mode. In stage 303, one tests if packet-switched data transmission may be utilised or not. Within the packet-switched data transmission mode there may be, for example, UMTS/GPRS, EDGE/GPRS or GSM/GPRS (not shown in FIG. 3) set to a preferential order. If one establishes that a packet-switched data transmission connection is possible, existing geographical data are transmitted and one moves to stage 307. In stage 307, the tracker may end the tracking of the object by selecting alternative NO. In an advantageous embodiment, the ending command of measurement is communicated with a separate command to the locating device 2. Then, the locating device 2 is set to a stand-by mode in which at least the GPS locator 206 is turned off.

If in stage 307 one decides to continue locating measurements, the alternative YES, then the tracker's terminal 3 advantageously transmits a message representing the continuation of measurement to the locating device 2. Then, the process continues from stage 302 in which the next location finding is performed. In an advantageous embodiment of the invention, the locating device 2 is set to a stand-by mode 308, if it does not receive a continuation message of measurement during a defined time window. This may be a consequence of a selection of the alternative NO in stage 307.

If one establishes in stage 303 that it is not possible to utilise packet-switched data transmission, one moves to stage 304. In stage 304, one examines if a circuit-switched connection can be established. If it is possible to connect, the alternative YES, a connection Is established, an SMS message including the geographical data is transmitted and one moves to stage 307 in which one decides on the continuation of locating in a above-described manner.

If it is not possible to establish a circuit-switched connection, one moves to stage 305 in which one examines if a direct radio connection between the locating device 2 and the tracker's terminal 3 may be achieved. If this is possible, a radio connection is connected and geographical data are transmitted. After this, one moves to stage 307 either immediately or after a user-defined time has elapsed. In stage 307, one acts in the above-described manner.

If a bidirectional radio connection is not possible, it is possible to control the locating device 2 to operate as a radio bearing transmitter in stage 306. This transmission may take a bearing with an appropriate directional receiver (not shown in FIG. 1a). Then, no GPS geographical data are included in the transmission, because the GPS locator 206 is advantageously turned off for saving the power of the batteries of the locating device 2. The user can also define the duration of stage 306. When the time defined for stage 306 has elapsed, one returns to stage 307. After this, it is possible to try again a data transmission connection via a data transmission network.

The above-described method stages are implemented with two software applications. A first software application is installed in the tracker's device 3. By means of it, one may define the operation model of the locating device 2, transmit commands to the tracking device 2 and display the obtained locating result on the display of the locating device 2.

A second software application is installed in the locating device 2. It controls performing locations and data transmission based on commands received from the tracker's device 3.

Above are described advantageous embodiments of a locating method, device and locating arrangement according to the invention. The invention is not limited to the above-described solutions, but it is possible to apply the inventive idea with several ways within the limitations set by the claims.

The invention claimed is:

1. A locating method of a living, moving object being tracked, in which method:
   the object being tracked carries a locating device comprising a combined GPS locator and terminal of a cellular network;
   the tracker of the object uses a tracking device provided with a display to which the location data of the GPS locator are communicated;
   during tracking, one of the following may be selected in the tracking device for the operation mode of the GPS locator of the locating device:
      tracking at the tracker's command;
      continuous tracking;
      periodic tracking;
      area tracking; and
   for minimising the power consumption of the locating device of the object being tracked, selecting in the tracking device a data transmission mode from the following alternative transmission modes as the transmission mode of location data:
      packet-switched data transmission in a cellular network wherein one of the following is selected as the packet-switched data transmission mode: a UMTS/GPRS, an EDGE/GPRS, or a GSM/GPRS connection;
      circuit-switched data transmission in a cellular network;
      a direct radio connection between the terminal and the tracker's device; or
      using the terminal as a radio bearing transmitter.

2. The method according to claim 1, wherein the tracking at the command of the tracker comprises:
   transmitting a locating command from the tracking device via a cellular network to the GPS locator of the locating device;
   performing locating measurement with the GPS locator, if it is possible to be implemented;
   setting the GPS locator in a stand-by mode; and
   transmitting the last available locating result via the cellular network to the tracking device.

3. The method according to claim 1, wherein the continuous tracking comprises:
   commencing continuous location by transmitting a command from the tracking device via a cellular network to the GPS locator of the locating device;
   performing a locating measurement with the GPS locator, if it is possible to be implemented, and
   transmitting the last available locating result from the locating device via the cellular network to the tracking device.

4. The method according to claim 1, wherein the periodic tracking comprises:
   commencing periodic location by transmitting from the tracking device a command via a cellular network to the GPS locator of the locating device;
   performing a locating measurement in defined intervals with the GPS locator, if it is possible to be implemented;
   setting the GPS locator in a stand-by mode for the interval of the locating measurements; and
   transmitting the last available locating result from the locating device via the cellular network to the tracking device.

5. The method according to claim 1, wherein the area tracking comprises:
   commencing area location by transmitting a command from the tracking device via the cellular network to the GPS locator of the locating device;
   performing a locating measurement with the GPS locator, if it is possible to be implemented;
   setting the GPS locator in a stand-by mode if the object being tracked is within a defined area; and
   transmitting the last available locating result from the locating device via the cellular network to the tracking device, if the locating result is established to be outside a defined geographical data for the object being tracked in the device it carries.

6. A method according to claim 1, wherein GSM data transmission is used as the circuit-switched data transmission mode.

7. A location arrangement of a living, moving object, in which:
   the object being tracked is arranged to carry a combined GPS locator and terminal of a cellular network;
   the tracker of the object has a tracking device provided with a display in which the location data of the GPS locator are arranged communicable;

during tracking, in the tracking device one of the following alternative tracking modes is arranged to be selected for the operation mode of the GPS locator:
- tracking at the tracking device's command;
- continuous tracking;
- periodic tracking;
- area tracking; and minimising the power consumption of the terminal of the object being tracked, one data transmission mode from the following alternative transmission modes is arranged as the data transmission mode of location data:
- packet-switched data transmission in a cellular network wherein one of the following is the packet-switched data transmission mode: a UMTS/GPRS, an EDGE/GPRS, or a GSM/GPRS connection;
- circuit-switched data transmission in a cellular network;
- a direct radio connection between the terminal and the tracker's device; or
- the terminal is arranged to be used as a radio bearing transmitter

8. The locating arrangement according to claim 7, wherein the tracker's device is a terminal of the cellular network.

9. The locating arrangement according to claim 7, wherein the tracker is a separate tracking organisation for which the location data of the object is communicable by the owner of the object being tracked.

10. The locating arrangement according to claim 7, wherein the location data of the object is communicable to at least two terminals of the cellular network at the same time.

11. A locating device carried by a living, moving object being tracked, comprising:
- a terminal of a cellular network;
- a GPS locator integrated in the terminal;
- a receiver for:
  - receiving a location command from a tracking terminal and a central processing unit executing a location command for selecting one of the following alternative tracking modes to be used as a tracking mode for minimising the power consumption of the terminal:
    - tracking at the tracker's command;
    - continuous tracking;
    - periodic tracking;
    - area tracking; and
  - receiving a transmission mode selection command from the tracking terminal to be executed in the central processing unit for minimising the power consumption of the terminal, by selecting a data transmission from the following alternatives as the data transmission mode of location data:
    - packet-switched data transmission in a cellular network wherein one of the following is the packet-switched data transmission mode: a UMTS/GPRS, an EDGE/GPRS, or a GSM/GPRS connection;
    - circuit-switched data transmission in a cellular network;
    - a direct radio connection between the terminal and the tracker's device; or
    - the terminal is arranged to be used as a radio bearing transmitter.

12. The locating device according to claim 11, wherein a location mode and a data transmission mode commands are saved in a SIM card of the terminal of the cellular network.

13. A non-transitory computer-readable storage medium containing a set of instructions for execution by a processor unit of a tracking device, the set of instructions comprising:
- a code segment for selecting one of the following alternative tracking modes to be used as a tracking mode:
  - tracking at the tracker's command;
  - continuous tracking;
  - periodic tracking;
  - area tracking; and
- a code segment for minimising the power consumption of a locating device for selecting a transmission mode from alternative tracking modes capable of data transmission:
  - packet-switched data transmission in a cellular network wherein one of the following is the packet-switched data transmission mode: a UMTS/GPRS, an EDGE/GPRS, or a GSM/GPRS connection;
  - circuit-switched data transmission in a cellular network;
  - a direct radio connection between the terminal and the tracker's device; or
  - converting a terminal of the locating device to a radio bearing transmitter.

\* \* \* \* \*